(12) United States Patent
Attard

(10) Patent No.: US 7,791,233 B1
(45) Date of Patent: Sep. 7, 2010

(54) HIGH TORQUE ELECTRIC MOTOR/FLYWHEEL

(76) Inventor: Michael T. Attard, 32222 Annapolis, Wayne, MI (US) 48184

( * ) Notice: Subject to any disclaimer, the term of this patent is extended or adjusted under 35 U.S.C. 154(b) by 449 days.

(21) Appl. No.: 11/877,866

(22) Filed: Oct. 24, 2007

(51) Int. Cl.
  H02K 37/00 (2006.01)
  H02K 23/60 (2006.01)
  H02K 21/12 (2006.01)
  H02K 1/22 (2006.01)

(52) U.S. Cl. ............... 310/74; 310/46; 310/116; 310/156.37; 310/262

(58) Field of Classification Search ............... 310/156.37–156.38, 156.43, 156.45, 156.56, 310/153, 418–421, 426, 74, 216.121–216.123, 310/262, 116; 384/456
See application file for complete search history.

(56) References Cited

U.S. PATENT DOCUMENTS

| | | | |
|---|---|---|---|
| 1,192,404 A * | 7/1916 | Ewart | 403/261 |
| 3,396,291 A | 8/1968 | Somerville | |
| 3,466,479 A * | 9/1969 | Jarret et al. | 310/168 |
| 4,045,696 A | 8/1977 | Lutz et al. | |
| 4,169,235 A | 9/1979 | Higuchi et al. | |
| 4,441,043 A * | 4/1984 | DeCesare | 310/46 |
| 4,543,506 A | 9/1985 | Kawada et al. | |
| 4,864,175 A | 9/1989 | Rossi | |
| 5,004,944 A | 4/1991 | Fisher | |
| 5,486,730 A | 1/1996 | Ludwig et al. | |
| 5,691,589 A | 11/1997 | Keim et al. | |
| 5,877,578 A | 3/1999 | Mitcham et al. | |
| 6,252,323 B1 | 6/2001 | Nishikawa et al. | |
| 6,481,090 B1 * | 11/2002 | Franco et al. | 29/598 |
| 6,720,702 B2 | 4/2004 | Knauff | |
| 6,867,524 B2 | 3/2005 | Liang | |
| 6,873,077 B2 | 3/2005 | Jurisch | |
| 2006/0220483 A1 * | 10/2006 | Jones et al. | 310/156.19 |

FOREIGN PATENT DOCUMENTS

JP 2004364368 A * 12/2004

OTHER PUBLICATIONS

Machine Translation JP2004364368 (2004).*

* cited by examiner

Primary Examiner—Quyen Leung
Assistant Examiner—Jose A Gonzalez Quinones
(74) Attorney, Agent, or Firm—Steve M. Clemmons

(57) ABSTRACT

A high-torque electric motor having a rotor supported by an elongated torque arm comprising a pair of frustoconical-shaped support members. The rotor has a spherical-shaped outer surface and a complementarily shaped stator cavity. The spherical magnetic elements and the conical support members cooperate to brace the rotor against deflection along its rotational axis.

4 Claims, 7 Drawing Sheets

HIGH TORQUE ELECTRIC MOTOR/FLYWHEEL

FIELD OF THE INVENTION

This invention relates to electric motors. More particularly, to electric motors having an elongated rotor torque arm mounted to the output shaft to increase the torque applied to the output shaft.

BACKGROUND OF THE INVENTION

An electric motor's power is proportional to its torque and rotational speed. Increasing one or both of these properties increases the motor's power (i.e., its horsepower).

An electric motor has two basic components: a stator and a rotor. At least one of these components includes magnets, whose magnetic fields cause the rotor to move relative to the stator, usually by rotating about a central shaft.

The stator is the stationary electrical component. It typically includes a group of individual permanent magnets or electro-magnets arranged in a way to form a hollow, generally cylindrical shell with one pole of each magnet facing toward the center of the group.

The rotor is the rotating electrical component and typically comprises a generally cylindrical body mounted to a central shaft. The rotor includes a second group of magnets which are arranged around the outer surface in close proximity to the stator's magnets. The interaction between the magnetic fields of these magnets causes Lorentz forces to be exerted upon the rotor causing the rotor to turn, which causes the motor's output shaft to rotate. The distance between the rotor's magnets (where the Lorentz forces are directed against the rotor) and the output shaft represents the torque arm length of the motor. That is, the radius of the rotor determines the amount of torque applied to the output shaft by a given magnetic field.

Currently, in order to increase motor torque the Lorentz forces are increased by using larger magnetic surfaces and/or using more electrical power. While these systems will produce greater amounts of torque, they increase the motor's cost, size and weight.

Increasing the motor's rotational speed, while increasing the motor's power output, generally causes the rotor to vibrate or otherwise become unstable. One example of this instability is that the rotor will deflect or cant along its axis. This deflection and vibration limits how fast a particular motor may be run. One cause of this undesirable deflection at higher rotational speeds is that the support members/torque arms of conventional rotors typically project orthogonally from the rotor shaft and do not have adequate support along the rotational axis (along the rotor shaft).

Similarly, increasing the torque arm length of conventional motors requires the rotational speed to be reduced in order to avoid instability. By lowering rotational speed, the power benefits of the increased torque are offset of the lowered rotational speed.

SUMMARY OF THE INVENTION

The broad purpose of the present invention is to provide an electric motor having an increased torque arm length to increase motor torque, while supporting the rotor along the rotational axis to prevent rotor instability.

It is an advantage of the present invention to provide an electric motor having a rotor frame comprised of two opposed frusto-conically shaped supports.

It is another advantage of the present invention to provide a rotor including a plurality of removable blocks containing the rotor's magnetic elements. The blocks including quick connect/disconnect electrical connections to facilitate removal.

It is still another advantage of the present invention to provide an electric motor having its rotor and stator in a generally ball-shaped configuration to improve rotational balance and to present the largest magnetic surface area over a particular diameter.

It is yet another advantage of the present invention to provide an electric motor having a rotatable output shaft including a rotor assembly and a stator. The rotor includes a support member fixed to the output shaft. The support member is formed from a pair of spaced frusto-conical-shaped walls, each wall is mounted to the output shaft at a first end and tapers radially away from the output shaft and toward the other wall, terminating at a second end. The rotor also includes first magnetic means or elements mounted to the support member. The stator rotatably receives the rotor and includes second magnetic means or elements which are arranged around the stator effective to cause the rotor to rotate and turn the output shaft.

It is still yet another advantage of the present invention to provide a high-torque electric motor comprising a rotor assembly mounted to a central output shaft and a stator having a housing which defines an internal rotor-receiving cavity. The rotor assembly comprising a two cone-shaped support member, each having a hub fixedly mounted to the output shaft. Elongated annular walls taper away from the hubs at an angle and terminates at an outer end, wherein the support members are mounted to the output shaft such that the annular walls taper toward each other. The rotor assembly also includes a plurality of electromagnets mounted to the support members at their outer ends and are spaced evenly around the output shaft. The stator including a plurality of permanent magnets that are axially spaced evenly about the rotor-receiving cavity.

It is still yet another advantage of the present invention to provide an electric motor that rotates an output shaft, comprising: a first rotor support shell having a cone-shaped wall which tapers from a first narrow end to a first wide end, wherein the first rotor support shell is fixed to the output shaft at the first narrow end; a second rotor support shell having a cone-shaped wall which tapers from a second narrow end to a second wide end, wherein the second rotor support shell is fixed to the output shaft at the second narrow end, wherein the shells are mounted to the output shaft such that the shells taper toward each other; a toroid-shaped mounting base which is fixedly mounted to the first and second wide ends; a plurality of support arms which extend from opposite sides of the mounting base, the support arms running generally parallel to the output shaft, the arms are axially spaced evenly around each side of the mounting base, wherein an outer peripheral surface of the mounting base and an outer peripheral surface of the arms cooperate to form a ball-shaped magnet-mounting surface; a plurality of wedge-shaped electromagnets, the electromagnets are mounted to the mounting base and the arms at the magnet-mounting surface, the outer periphery of each of the electromagnets cooperatively define a ball-shaped outer surface.

Still further objects and advantages of the invention will become readily apparent to those skilled in the art to which the invention pertains, upon reference to the following detailed description.

BRIEF DESCRIPTION OF THE DRAWINGS

The description refers to the accompanying drawings in which like reference characters refer to like parts throughout the several views and in which.

DETAILED DESCRIPTION OF THE INVENTION

Figure 1:
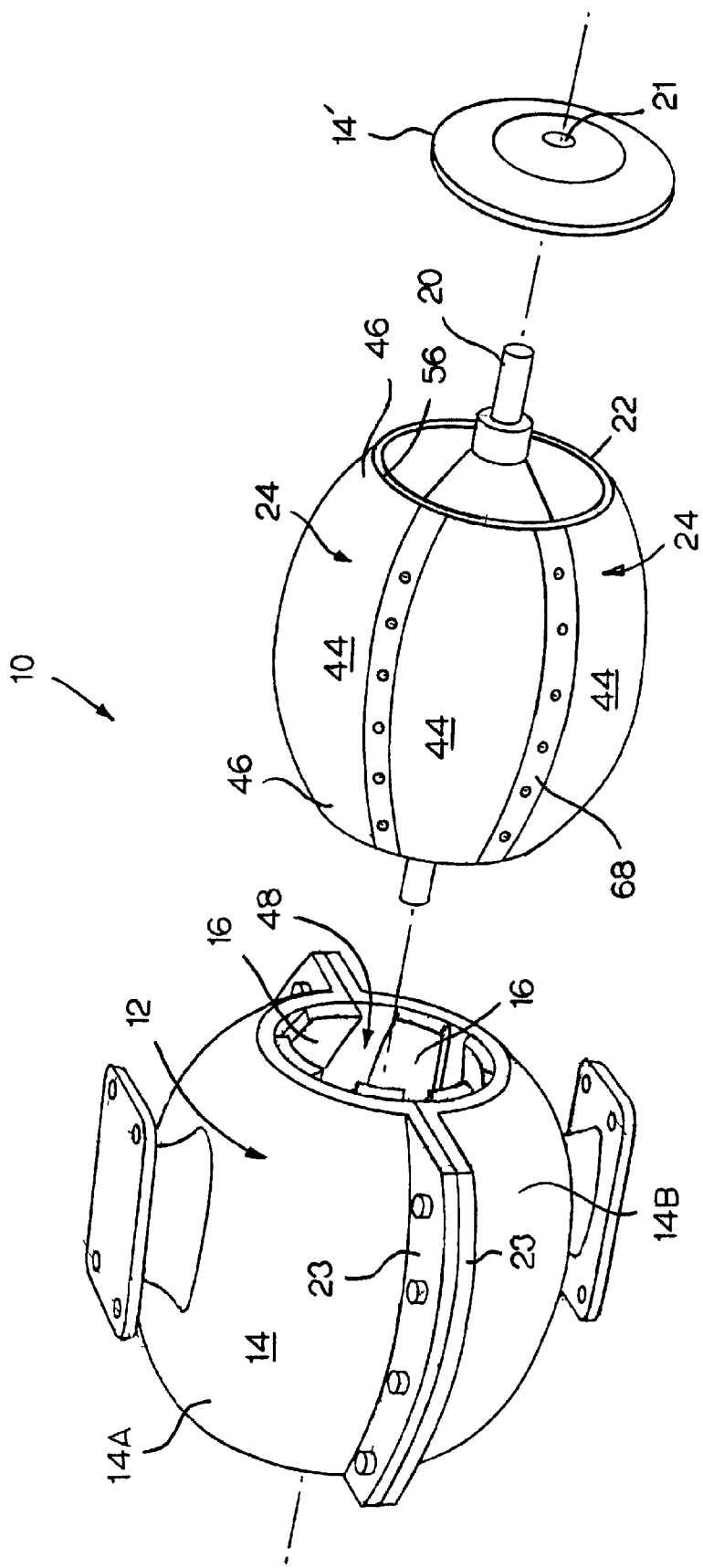
FIG. 1 is a perspective partially-exploded view of the high torque electric motor.

Referring now to FIG. 1, an improved electric motor 10 is shown including a stator 12 having a housing 14 which contain a magnetic elements or means 16, such as a plurality of permanent magnets. Motor 10 also includes a rotor assembly 18 which is fixedly mounted to a central output shaft 20. Shaft 20 is free to rotate on bearing means 21 that are mounted to stator housing 14. In the preferred embodiment, stator housing 14 is formed in two separable sections 14A, 14B which are joined along side flanges 23 by conventional means, such as mechanical fasteners. In one embodiment, a stator cover plate 14' encloses the rotor assembly 18 when mounted within the generally cylindrical stator cavity. In this embodiment, this plate 14' includes the bearing means 21 that engage the output shaft 20.

Rotor assembly 18 includes a support member 22 that is fixed to the output shaft 20 and magnetic elements or means 24 peripherally mounted to support member 22.

Support member 22 includes a pair of substantially identical conically or frusto-conically shaped shells 26, 27 formed from a relatively thin, but rigid non-ferrous material, such as aluminum sheet. Shells 26, 27 are mounted concentrically to shaft 20 such that their wide ends or bases 26A and 27A face each other while narrow ends or hubs 26B, 27B face in opposite directions. In this manner the side walls 26C, 27C of the shells taper toward each other and away from the central shaft 20. In the preferred embodiment walls 26C, 27C both form a forty-five degree angle with shaft 20. Brackets 28 rigidly couple the hubs 26B, 27B to shaft 20 in a conventional manner, such as welding or mechanical fasteners.

Figure 8:
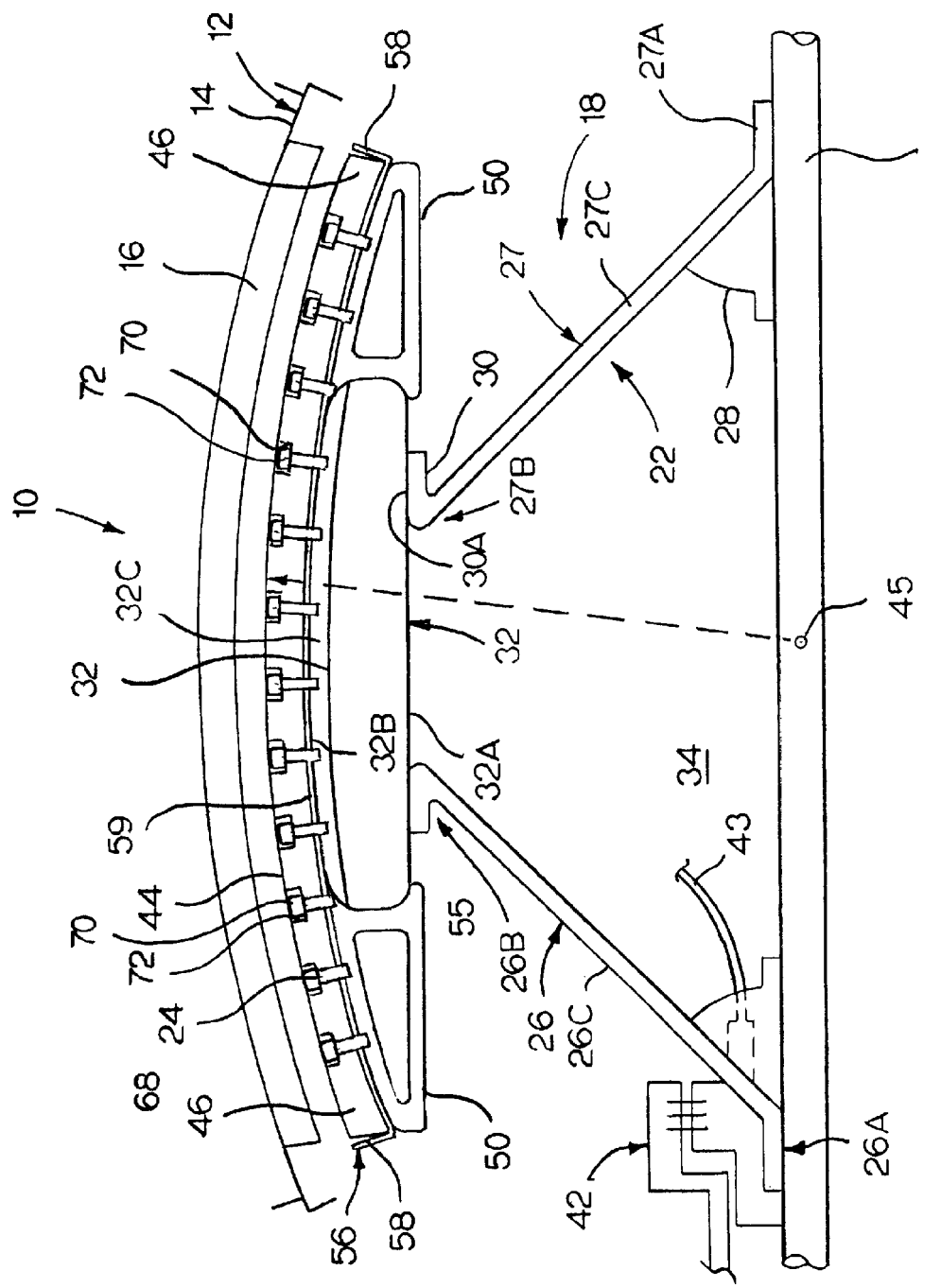
FIG. 8 is a half side sectional view of the rotor assembly through one of the electromagnets retention blocks.

In the preferred embodiment, each shell 26, 27 terminates at an annular lip 30 having an outer surface 30 that is parallel to the rotational axis of shaft 20. A toroid-shaped mounting body 32 having a generally cylindrical inner surface 32A which abuts and is fixed to outer surface 30A of each shell 26, 27. Walls 26C, 27C and body 32 cooperate to define an internal opening or cavity 34. Body 32 is preferably formed from a relatively lightweight, durable material, such as aluminum and, as will be discussed in greater detail below, the outer surface 32B of body 32 is preferably outwardly curved or convex in shape. As best shown in FIG. 8, body 32 also includes a series of spaced support members 32C which run beneath the outer surface 32B.

Magnetic elements 24 are mounted to outer surface 32B of body 32. In the preferred embodiment, these magnetic elements 24 are electromagnets formed from electrically conductive windings 38 wrapped around a core 40 of highly permeable magnetic material, such as iron or steel which runs along the longitudinal length of each electromagnet. The electromagnets 24 are electrically coupled to a source of electrical energy, such as a battery, via a rotary electrical interface 42 and armature wiring 43 that passes through cavity 34 and runs to each electromagnet.

Figure 3:
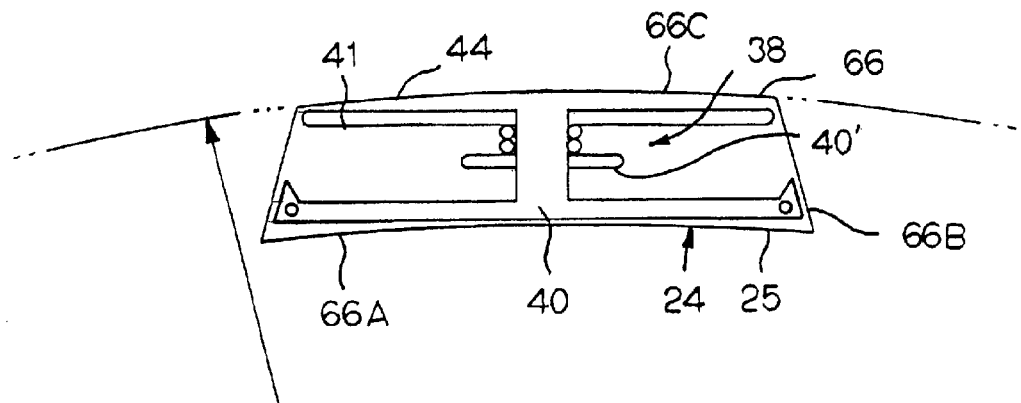
FIG. 3 is a side sectional view through one of the rotor's magnetic elements.

It should be appreciated that each core 40 receives multiple individual electrical wires, which cooperatively form windings 38 that are wrapped around the core 40. In the preferred embodiment of the invention and as best shown in FIG. 3, the windings 38 only cover the outer portion of the core 40 and rest upon a seat 40' that extends from the approximate center of the core. Further, the radially outermost wires 38' wrapped around the core are preferably flattened to maximize the surface area of the portion of the windings 38 that are in closest proximity to the stator's magnetic elements 16.

In one embodiment, the electromagnet's windings 38 and core 40 are encased in a high dielectric strength, water resistant, resilient material 41 which dissipates heat from the electromagnet 24 similar to the dielectric materials surrounding the coils of conventional scrap handling electromagnets. This dielectric material 41 is retained by a shell or outer cover 25 formed from a thin layer of non-ferrous material, such as aluminum.

Figure 2:
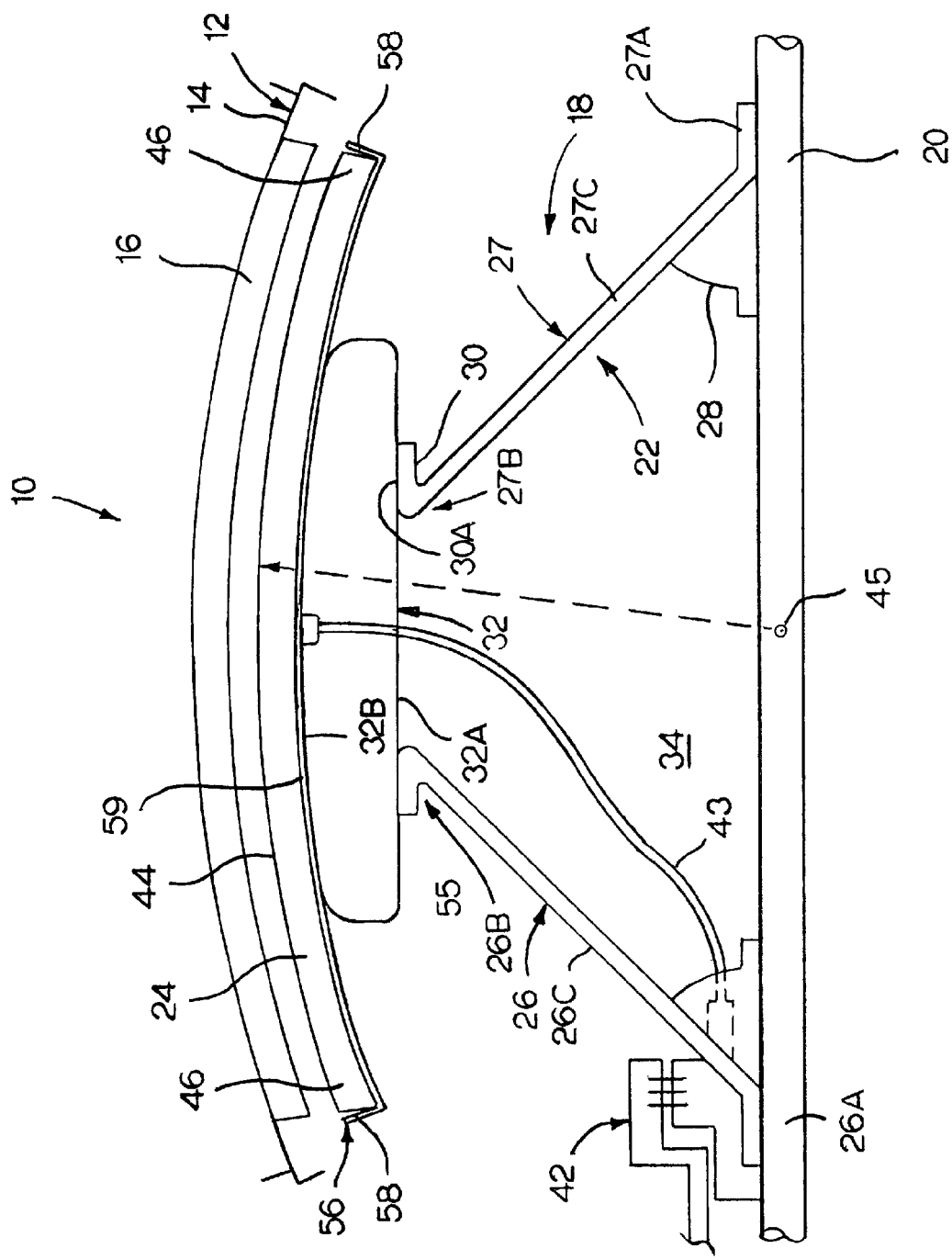
FIG. 2 is a half side sectional view of the rotor assembly through one of the peripherally mounted electromagnets.
Figure 4:
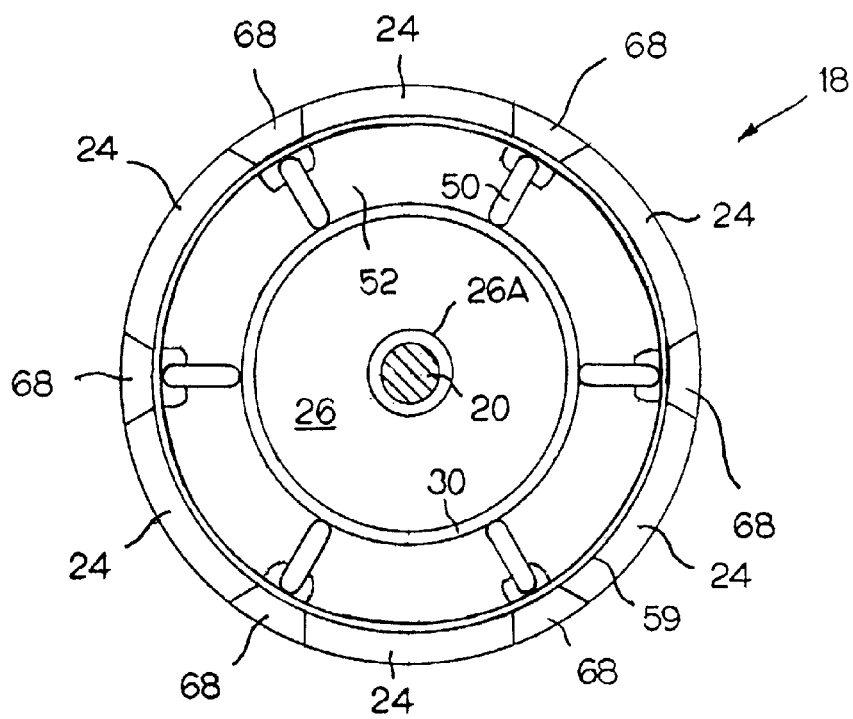
FIG. 4 is a view of the rotor assembly along its rotational axis.
Figure 5:
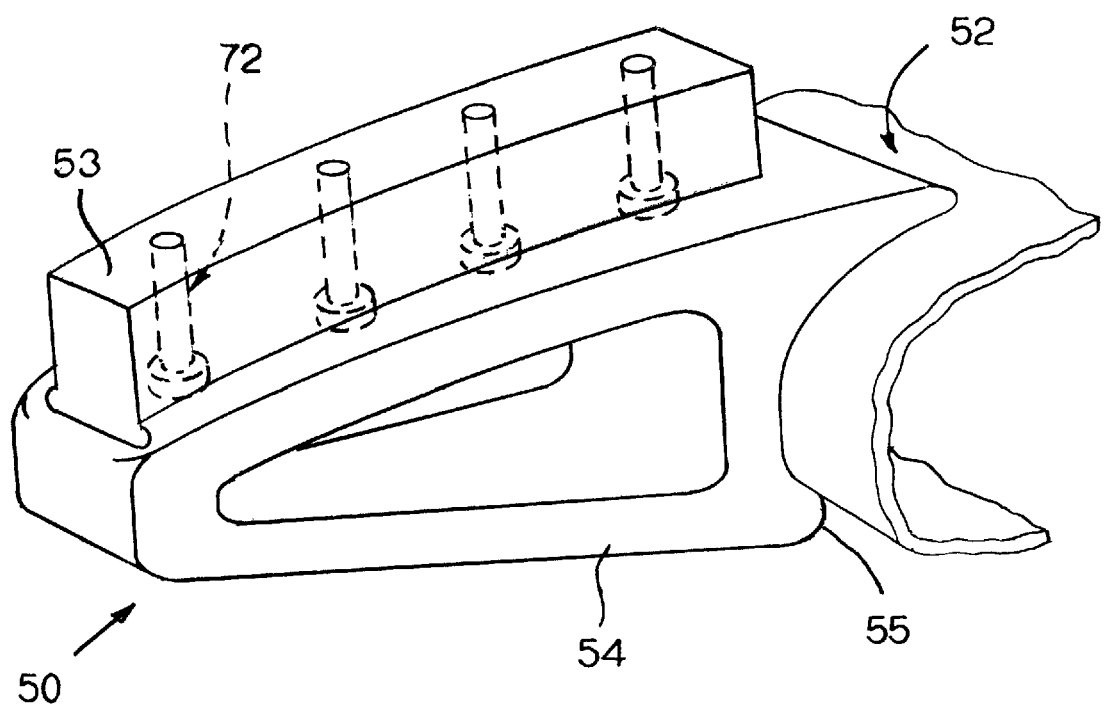
FIG. 5 is a perspective view of a rotor assembly support arm.
Figure 6:
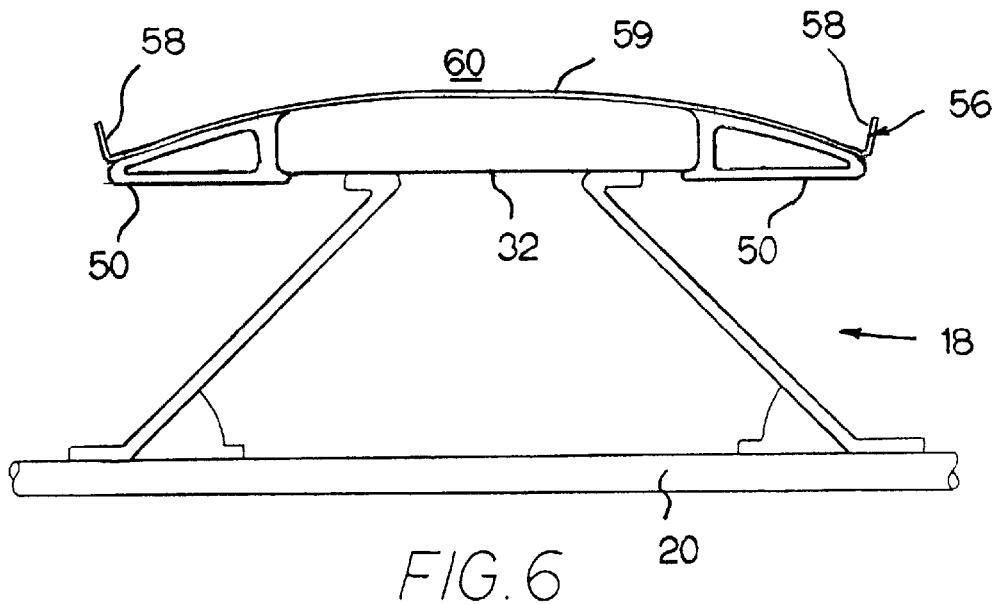
FIG. 6 is a half side sectional view of the rotor assembly with the magnetic elements removed.

Referring now to FIGS. 1, 2, and 4, a plurality of electromagnets 24 are spaced equally about the outer surface 32B. The number of rotor magnetic elements can vary, but in one embodiment, six electromagnets 24 are spaced about the rotor. These electromagnets 24 are preferably generally rectangular having their long side running parallel to shaft 20. It should be appreciated that the even spacing of substantially identical electromagnets 24 produces a rotor assembly 18 which is weighted evenly about the output shaft 20 to ensure the rotor is balanced. Dynamic balancing/testing of the rotor assembly 18 and adding or removing material from the rotor, such as to/from the support member 22 will further ensure that rotor assembly 18 is balanced.

As best shown in FIGS. 2 and 3, each electromagnet 24 is preferably curved or rounded, such that the outer surfaces 44 of the electromagnets 24 cooperate to present a generally spherical or ball-shaped appearance. In one embodiment, each point on the outer surface 44 of every one of the electromagnets, when mounted to the rotor assembly 18, is a fixed distance or radius from a given centralized point along the centerline 45 of shaft 20. It should be appreciated that by curving the electromagnets 24, more surface area of the outer surface 44 can be maximized for a particular size/diameter rotor. Additionally, the magnetic forces exerted on the opposing inwardly curving (i.e., toward the shaft 20) longitudinal ends 46 of the electromagnets 24 resist axial deflection of the rotor to further balance the rotating rotor assembly 18. Magnetic elements 24 are coupled to body 32 using conventional fastening techniques, such as welding (e.g., core 40 to the body 32) or mechanical fasteners.

In all embodiments, the longitudinally running windings 38 must form an angle with the rotational axis of shaft 20 that is less than forty-five degrees. If the windings curve beyond forty-five degrees relative to the shaft, the resulting magnetic forces will begin to work against the desired rotation of the rotor.

Housing 14 of stator 12 includes an internal cavity 48 that is shaped complementary to the ball-shaped outer surface 44 of the rotor assembly 18. The stator magnetic elements 16 are mounted within this rotor-shaped cavity 48 and are generally concave elongated rectangular magnets that are spaced evenly around the longitudinal axis of the cavity. In the preferred embodiment, stator magnetic elements 16 are high strength permanent magnets which are arranged within housing 14 with the inwardly directed portion (i.e., toward shaft 20) of each magnet 16 has the same polarity. In the preferred embodiment, electromagnets 24 are synchronized/controlled such that half of the electromagnets are energized, while the remaining electromagnets are deactivated (i.e., not energized) at any given time. In this manner, one half of the circumference of the rotor will be generating a magnetic field and producing a large surface area for magnetic pull. In the preferred embodiment, every other electromagnet 24 will be activated as they pass from one permanent magnet to the next to maximize the attractive/repulsive forces. Typically, the energized half of electromagnets are deactivated when they are just crossing the midway point of the permanent magnets' surface. At that time, the other, previously deactivated electromagnets are energized.

It should be appreciated that various electromagnet timing and permanent magnet polarity arrangements may be employed using the current motor 10. For example, in other embodiments, each adjacent magnet 16 has the opposite polarity (i.e., magnets 16 alternate between positive and negative polarity around cavity 48). In this manner, magnets 16 alternatively repel and attract the rotating electromagnets 24 in the rotor assembly 18. In another non-limiting example, instead of pulsing the electromagnets 24 on and off, the polarity of the magnets 24 may be reversed to both attract and repel the magnetic fields from the stator's permanent magnets 16.

Importantly, by supporting the rotor's magnetic elements 24 with a tapered frame formed by opposed frusto-conical shells, the rotor is braced against any deflection of vibration along the rotational axis. This axial support/bracing permits the distance between the magnetic elements 24 and the rotational axis (shaft 20) to be extended, thereby increasing the torque of the motor for a given amount of electrical energy put into the motor. This axial bracing also enables the rotor to be rotated at a faster rotational speed compared to conventional rotors without unbalancing the motor.

The above-described pulsing/timing of the electromagnets 24 to maximize the magnetic field interaction between the rotor and stator in combination with the capability of elongating the torque arm (i.e., by increasing the radial distance between the output shaft 20 and the electromagnets' outer surface 44) using the conical support 22 result in motor 10 having increased horsepower and torque than comparably sized conventional motors.

By curving the magnetic elements of the rotor (and its complementarily shaped stator) the present invention maximizes the magnetic surface area, thereby maximizing the magnetic forces exerted. Additionally, the inwardly curving shape of the rotor assists in balancing the rotating rotor.

Further, the windings 38 and core 40 of the electromagnets are comparatively heavy relative to the other rotor components. This mass is mounted to the rotor shaft at an extended distance compared to conventional motors, which use a comparable amount of electrical energy, as discussed above. This balanced heavy weight revolving about the shaft 20, results in a flywheel-like high mass moment of inertia. This additional moment of inertia, compared to conventional motors, results in less energy required to keep the rotor assembly 18 rotating at a given speed (once it is brought up to that speed).

Figure 7:
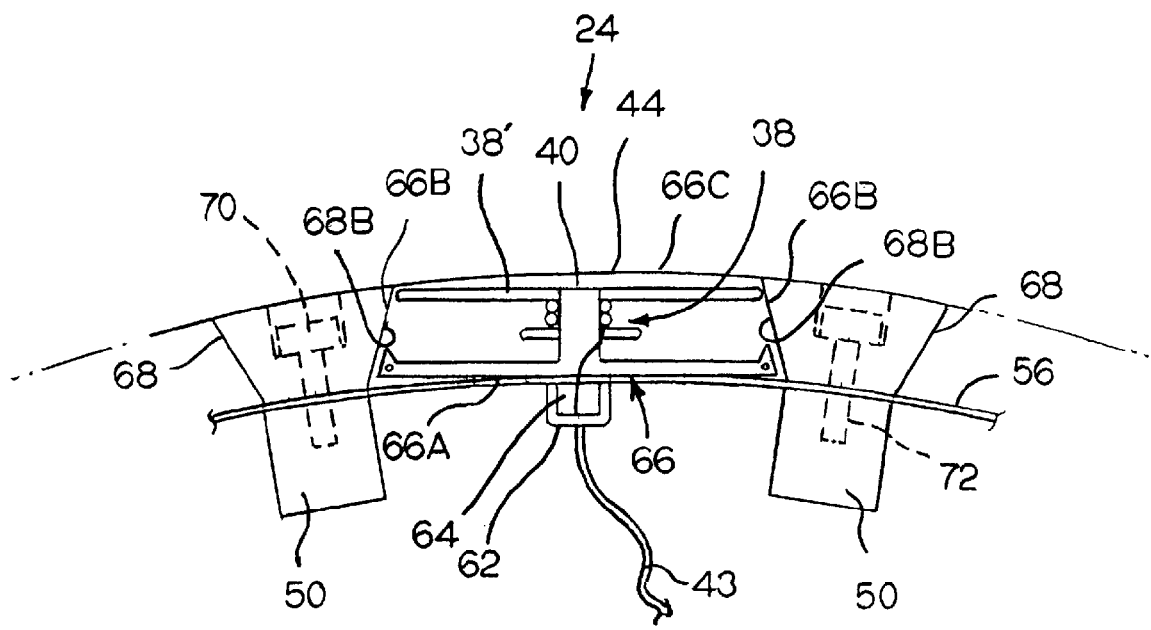
FIG. 7 is a sectional view of through one of the rotor's magnetic elements and adjacent retention blocks.

As best shown in FIGS. 7 and 8, the electromagnetic elements 24 are removably mounted to the rotor assembly 18. That is, each of the electromagnets 24 are individually mounted and retained within a toroid-shaped support tray 56 which is fixed to the outer surface 32B of the mounting body. In this embodiment, tray 56 extends beyond mounting body 32 and is supported on both sides by arms 50.

Referring now to FIGS. 1, and 5-8, in the preferred embodiment, the magnetic elements 24 of rotor assembly 18 extend beyond the body 32, thereby increasing the surface area of elements 24. To keep the weight of the support structure to a minimum, a plurality of support arms 50, equal in number to the number of magnetic elements 24 mounted to the rotor are mounted to each sidewall 52 of the body 32. Support arms 50 include a contoured mounting rail 53 that is supported by an angled buttress 54 mounted therebeneath. Each arm 50 is fixedly mounted to the sidewall 52 by conventional means. In one embodiment, a support lip 55 extends along the inner or bottom surface 32A of body 32 and may abuttingly engage lip 30. The mounting rail 53 is curved to follow the contour of the rounded support tray 56 located beneath the magnetic elements 24 and retention blocks 68.

Tray 56 includes a pair of annular walls 58 mounted on opposite ends of the tray which cooperate with the bottom tray wall 59 to form a radially outwardly facing recessed area 60. Bottom wall 59 is shaped complementary to surface 32B and presents a generally curved surface while walls 58 preferably extend away from bottom 59 perpendicular to the rotational axis of shaft 20. Tray 56 is preferably formed from a relatively lightweight, durable, non-magnetic material, such as aluminum.

In this embodiment, each armature wire 43 terminates in electric socket means 62 that is in communication with recessed area 60. Each electromagnet 24 includes complementary-shaped electric plug means 64 which is received by socket means 62.

As shown in FIGS. 3 and 7, each electromagnet 24 is configured as a block 66 having a wedge or trapezoidal-shaped cross-section. The base 66A of the blocks 66 is placed upon the tray bottom 59 with side walls 66B tapering inwardly to the upper face 66C. Adjacent to each magnet block 66 is a retention block 68, which also has a wedge or trapezoidal-shaped cross-section. Each retention block 68 is shaped to abuttingly engage and hold the two adjacent magnet blocks 66 to the tray 56 and rotor assembly. That is, each retention block 68 is mounted such that the side walls 68B abut the side walls 66B of the two adjacent magnets. A plurality of removable mechanical fasteners, such as bolts 70 couple blocks 68 to the arms 50 and base 32 which have complementary threaded bores 72. In the preferred version of this embodiment, the number of arms 50 equals the number of blocks 68 (which equal the number of electromagnet blocks 66) mounted to the rotor assembly 18. The interference/wedging fit between the mounting wedges 68 and the electromagnetic blocks 66 rigidly couples the rotor's magnetic elements to the rotor assembly, while enabling a user to readily remove one or more electromagnets 24 for repair or servicing.

As shown in FIGS. 1 and 8, additional mechanical fasteners 70 mount the retention blocks 68 to support member 32C.

Figure 9:
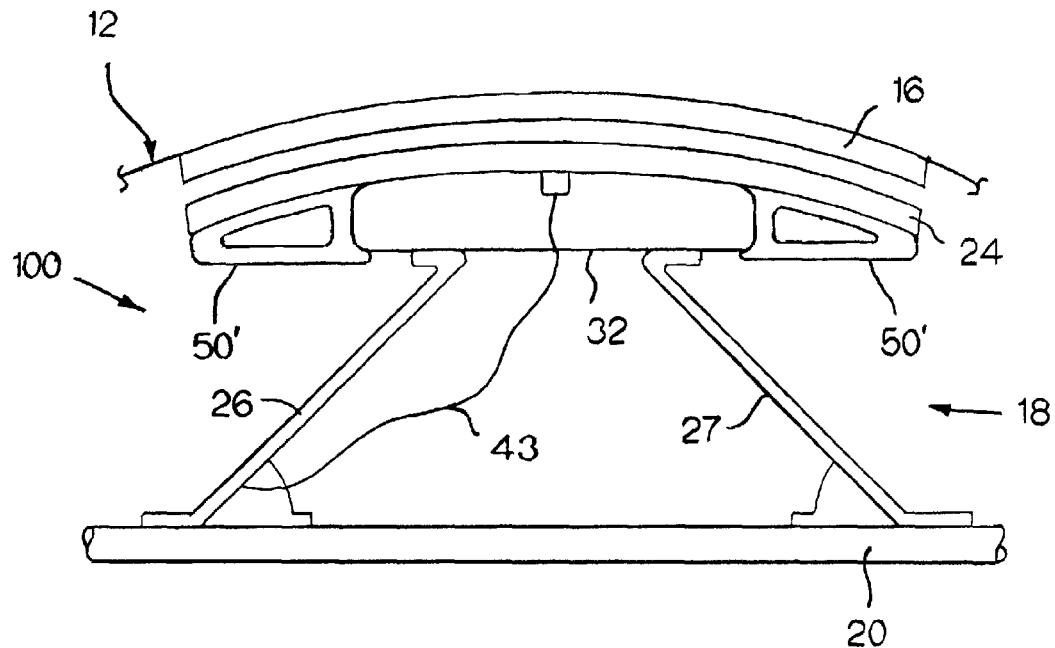
FIG. 9 is a half side sectional view of an alternate embodiment of the rotor assembly with the magnetic elements directly mounted to the support arms and body.

In an alternate embodiment of the motor, denoted 100, shown in FIG. 9, the magnetic elements 24 are directly and fixedly mounted to the mounting body 32. Support arms 50 are centered mounted beneath magnets 24 to provide additional support. While this embodiment simplifies the construction of the motor 100, by eliminating the mounting blocks 68, plugs 64, 66 and retention tray 56, the motor cannot be readily repaired if one of the electromagnets 24 fails.

Figure 10:
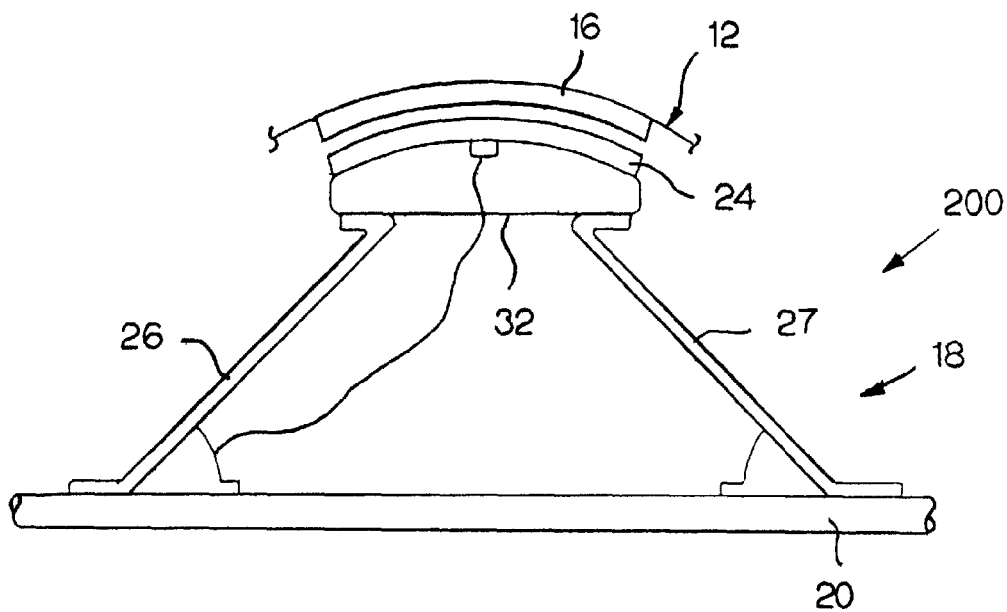
FIG. 10 is a half side sectional view of another alternate embodiment of the rotor assembly with the magnetic elements only running longitudinally along the body.

In still another alternate embodiment of the motor, denoted 200, shown in FIG. 10, the magnetic elements 24 of rotor assembly 18 do not extend beyond the body 32. This embodiment reduces the radially forces acting on the support member 22, but the reduced surface area of the magnets also reduces the torque-producing magnetic forces.

The invention has been described in an illustrative manner, and it is to be understood that the terminology, which has been used, is intended to be in the nature of words of description rather than of limitation. It is to be understood that the invention is not limited to the exact construction which has been illustrated and discussed above, but that various changes and modifications may be made without departing from the spirit and the scope of the invention as is more fully delineated in the following claims.

Having described my invention, I claim:

1. A high-torque electric motor comprising:
    a) a rotor assembly mounted to a central output shaft, comprising:
        a first cone-shaped support member having a first hub fixedly mounted to said output shaft, an elongated annular first wall tapers away from said first hub at an angle and terminates at a first outer end;
        a second cone-shaped support member having a second hub fixedly mounted to said output shaft, an elongated annular second wall tapers away from said second hub at an angle and terminates at a second outer end, wherein said annular walls taper toward each other;
        a plurality of electromagnets mounted to said support members at said first and second ends, said electromagnets are spaced evenly around said output shaft, wherein portions of said electromagnets extend axially beyond said outer ends; and
        a plurality of arms mounted to said first and second ends, wherein said arms support said extended electromagnet portions; and
    b) a stator having a housing which defines an internal rotor-receiving cavity, said stator including a plurality of permanent magnets that are axially spaced evenly about said cavity.

2. A high-torque electric motor as defined in claim 1, wherein said electromagnets have a radially outer-most surface, said outer-most surfaces of said plurality of electromagnets cooperatively forming a ball-shaped profile.

3. A high-torque electric motor as defined in claim 1, wherein said electromagnets comprise a plurality of elongated blocks having a wedge-shaped cross-section, said blocks each having side walls which taper from a wider lower base to a narrower upper base, further comprising:
    a plurality of blocks coupled to said support member, said blocks having tapered retention walls which abut each side wall face-wise.

4. An electric motor that turns an output shaft, comprising:
    a first rotor support shell having a cone-shaped wall which tapers from a first narrow end to a first wide end, wherein said first rotor support shell is fixed to said output shaft at said first narrow end;
    a second rotor support shell having a cone-shaped wall which tapers from a second narrow end to a second wide end, wherein said second rotor support shell is fixed to said output shaft at said second narrow end, wherein said shells are mounted to said output shaft such that said shells taper toward each other;
    a toroid-shaped mounting base which is fixedly mounted to said first and second wide ends;
    a plurality of support arms which extend from opposite sides of said mounting base, said support arms running generally parallel to said output shaft, said arms are axially spaced evenly around each side of said mounting base, wherein an outer peripheral surface of said mounting base and an outer peripheral surface of said arms cooperate to form a ball-shaped magnet-mounting surface;
    a plurality of wedge-shaped electromagnets, said electromagnets are mounted to said mounting base and said arms at said magnet-mounting surface, the outer periphery of each of said electromagnets cooperatively define a ball-shaped outer surface.

\* \* \* \* \*